(12) United States Patent
Silva De Jesus et al.

(10) Patent No.: US 10,308,530 B2
(45) Date of Patent: Jun. 4, 2019

(54) APPARATUS AND METHOD FOR THE MICROBIOLOGICAL CONTROL OF FLUIDS USING ELECTRIC AND MAGNETIC FIELDS GENERATED FROM ALTERNATE ELECTRICAL CURRENT OF LOW VOLTAGE AND LOW FREQUENCY

(71) Applicant: Bernardo Alberto Silva De Jesus, Santander (CO)

(72) Inventors: Bernardo Alberto Silva De Jesus, Santander (CO); Martha Lucia Silva Ramirez, Floridablanca (CO); Andres Mauricio Silva Silva, Madrid (ES); Julian Felipe Silva Silva, Floridablanca (CO)

(*) Notice: Subject to any disclaimer, the term of this patent is extended or adjusted under 35 U.S.C. 154(b) by 0 days.

(21) Appl. No.: 15/814,535

(22) PCT Filed: Jul. 30, 2016

(86) PCT No.: PCT/IB2016/054592
§ 371 (c)(1),
(2) Date: Nov. 16, 2017

(87) PCT Pub. No.: WO2017/029568
PCT Pub. Date: Feb. 23, 2017

(65) Prior Publication Data
US 2018/0148358 A1 May 31, 2018

(30) Foreign Application Priority Data
Aug. 14, 2015 (CO) .................................. 15-190523

(51) Int. Cl.
*B08B 9/027* (2006.01)
*C02F 1/48* (2006.01)

(52) U.S. Cl.
CPC .............. *C02F 1/484* (2013.01); *B08B 9/027* (2013.01); *C02F 2201/48* (2013.01); *C02F 2303/04* (2013.01); *C02F 2303/20* (2013.01)

(58) Field of Classification Search
CPC .............. B08B 3/10; B08B 9/027; C02F 1/48
See application file for complete search history.

(56) References Cited

FOREIGN PATENT DOCUMENTS

| GB | 2442011 A | * | 3/2008 |
| WO | WO 93/08127 | * | 4/1993 |

* cited by examiner

*Primary Examiner* — Sean E Conley
(74) *Attorney, Agent, or Firm* — Eugenio J. Torres-Oyola; Victor M. Rodriguez-Muriel; Rafael Rodriguez-Muriel

(57) ABSTRACT

The present application relates to an apparatus and method for fluids microbiological control in electrical conductive or not electrical conductive current pipes, by applying electric and magnetic fields generated from alternating electrical current of low voltage and low frequency. The apparatus is characterized by comprising a set of cells (21) of piping being electrical conductor or not, separated by electrical insulating joints (10A), but hydraulically interconnected to form sections (22) arranged or connected in series. The apparatus has an electrical arrangement that allows the direction of the magnetic field generated by the current passing through the insulated electric wire, which goes inside the pipe, be added to the direction of magnetic field generated within the pipe. The result of the sum of these magnetic and electrical fields is a tangential reinforced force. The reinforced resultant has helically—centrifuged form with direction to the inner wall of the tube (which carries lots of electrons). These electromagnetic forces push bacteria to the inner tube surface. These forces stress the membrane of these microorganisms and generating pores in the membrane, which eventually causes total lysis.

24 Claims, 10 Drawing Sheets

APPARATUS AND METHOD FOR THE MICROBIOLOGICAL CONTROL OF FLUIDS USING ELECTRIC AND MAGNETIC FIELDS GENERATED FROM ALTERNATE ELECTRICAL CURRENT OF LOW VOLTAGE AND LOW FREQUENCY

CROSS-REFERENCE TO RELATED APPLICATIONS

This application is the entry into national phase of International Application No. PCT/IB2016/054592 filed on Jul. 30, 2016, the content of which is hereby incorporated by reference in its entirety, which claims the benefit of Colombian Application No. 15-190523 filed on Aug. 14, 2015, the content of which is hereby incorporated by reference in its entirety.

FIELD OF TECHNOLOGY

The present invention relates to an apparatus and a method for microbiological control of industrial waters from different origins and uses, by applying electric and magnetic fields (EMF). Electro-Magnetic-Fields generates pores in the membranes of contaminating organisms, causing their breaking and thus the destruction of cells that produce biofilms on pipelines. In this invention specifically, a device that uses Alternate Current (AC) low voltage and low frequency is disclosed. And through a specific arrangement of electrical circuits generates strong electrical and magnetic fields with magnetic densities ranging from 1 µT to 300 µT.

BACKGROUND OF THE INVENTION

Sulfate Reducing Bacteria (SRB) and its associated bacteria are present in industrial waters, SRB produce hydrogen sulfide ($H_2S$), which is a poisonous gas that can kill living beings. These bacteria produce high rates of material corrosion, which eventually cause materials destruction. In the case of oil production fields, when high concentrations of $H_2S$ are generated, destruction occurs by corrosion of injection pipe equipment and wells. Causing often the abandonment of oil fields because the danger operation under these conditions, thus losing valuable oil reserves.

In addition to economic damage resulting from the loss of equipment and non-exploitation of oil reserves, production of $H_2S$ causes high pollution of the environment and can affect the health and even the life of living beings, whether human, animal or plants.

The Greather amount of $H_2S$ is formed in the biofilm. Biofilm protects the bacteria from the action of biocides. Most biocides wear out breaking the biofilm and when the biocide reach the bacteria, biocide do not have enough power, or the concentration required to kill bacteria is low and under these conditions the bacteria develop resistance to biocides.

The harmful effects of SRB, their associates and the biofilm they form have been addressed in several technical documents. Some existing patents and articles related with the treatment of contaminated fluids using Electro Magnetic Fields (EMF) are mentioned in the next paragraphs.

The paper "Effect of electric fields for reducing membrane fouling in dead-end filtration", Desalination and Water Treatment, Young G. Park, 2011, is related with the purification of the cell suspension in the process of the membrane under the influence of an electric field. This document shows an example of membrane process; the filtration time is reduced by the use of an electric field. However, the difference with the present invention is that it does not describe the arrangement or apparatus for generating the EMF and the document is oriented electro-hydraulic filtration processes.

The paper "Membrane cleaning using electric pulse in dead end ultrafiltration of proteinaceous solution", ASEAN Journal on Science and Technology for Development, A. L. Ahmad, 2001, refers to ultrafiltration through membranes and proposes a method for preventing the continuous formation of proteinaceous solutes on the surface of the membrane using electric pulses under the following conditions:

1. Variation of applying pulse interval
2. Variation of the pulse duration
3. Variation of the feed pH
4. Variation of ionic electrolyte effort
5. Variation of feed concentration
6. Variation of the electric field strength (voltage)
7. Using a computer and software to collect data, control and operational parameter setting
8. Application of 100V with 10 seconds pulse duration for each pulse interval of 10 minutes. Pulses of 100 V with 3, 5, 7.5, 10, 15, 20 and 40 duration seconds were also applied with pulse intervals of 20 minutes.

The findings reported herein suggest that the magnitude of the electrophoretic force is the main cause to kill bacteria under the influence of an electric field (pulse) having a linear relationship with the applied voltage. However, the difference with the present invention is that in the method of Ahmad, voltages between 12.5 V and 100 V are used, as in this invention the used voltages are between 0.1 V and 12 V. Additionally, this article does not describe the arrangement or apparatus by which EMF are generated.

The U.S. Pat. No. 7,033,481, patent "Electroionic processing system", presents an electro-ionic treatment that uses Alternate Current (AC) of high frequency to treat potable water, process water, residual water, bio-solids, muds as primary and secondary effluent and other biochemical process functions. In this patent the EMF are generated and coupled to an electrolytic apparatus through an apparatus a direct method, an apparatus and method of capacitive coupling and apparatus and method of inductive coupling.

The differences mainly refers to that the present invention handles low voltages and low frequencies, while the patent in question uses a current up to 150 kA (3 kV and 0.02Ω resistance) and uses frequencies between 20 kHz to 400 kHz. Additionally, in the arrangement for generating EMF electronic components such as capacitors and inductors are used, these elements are not part of the present invention.

U.S. Pat. No. 8,920,647, entitled Apparatus for preventing scale deposits and removing contaminants from fluid columns (which is a continuation in part of U.S. Pat. No. 8,066,886, also analyzed herein), describes a method and apparatus that provides a pulsating treatment to a fluid in a plurality of different points using pulsating magnetic energy concentrated at a plurality of different areas along the flow path of the fluid. Contrary to this patent, in the present invention is described in more detail the action of EMF into the cell, not coil conductors are used to generate EMF and a special arrangement is used for electrical connection, where the electrical conductor is not wounded around the pipe forming a coil. Additionally, a software (computer program) that controls EMF generation is used.

Furthermore, in US patent electrodes can be energized with electrical power, having an AC component or DC component. When the electrodes with electric power having a Direct Current (DC) component are energized, the polarity of the signal applied to the electrodes can be reversed periodically to reduce the presence of contaminants on the surfaces of the electrodes. The power supply can establish a pulse output having an AC component through a switching sequence. This makes the inventive concept quite different from that is handled in the present patent application.

Another patent application which concerns the issue is U.S. Pat. No. 3,753,886, entitled "A Selective destruction of bacteria," which describes a method and means for water purification and water based liquids, where a controlled amount of electrical current AC passes through the liquid to destroy all life forms in it and in this way to purify it. For this purpose a metal hollow element (tube) having an elongated terminal electrically connected to a source of electrical energy is used. The element is grounded and covered by an insulating material. The liquid in the element acts as a conductor between the terminal and grounded element, causing electric current to flow through, causing the liquid to be purified. In the patent application an alternating electric current of approximately 60 cps (Hz), from 2 to 8 amps, a voltage between 7 and 28 V is passing through the fluid to destroy impurities by vibration. This current is passed through the liquid from 1 to 8 minutes, until the liquid reaches a desired level of purity.

The main differences between the cited patent and the present invention is that the treatment process of fluids with EMF can be made continuous and/or pulsating manner and the control of the generation and application of EMF's is via a software developed for this purpose. The fluid treatment can be made in line (continuously in time) with other process in a plant.

Another important point is that differential values of the voltages used herein are between 0.1 and 12 V, which is lower than the values applied in the patent, which are between 7 V and 28 V. Added to the above, in the patent a metal hollow element (tube) having an elongated terminal electrically connected to a source of electrical energy is used. This element is grounded and covered by an insulating material.

Unlike the proposal, in the present invention the insulated conductor that goes inside the pipe is not landed, it is connected to an AC power source. Furthermore, the pipe arrangements in which the electric and magnetic fields are applied preferably are cells curved in "U" forms, electrically isolated from each other, and sections formed by groups of pipe cells.

The U.S. Pat. No. 4,572,775, whose title is "A Apparatus for sterilizing fluids" describes a method and apparatus which uses electrical current to remove bacteria from liquids. This method consists of a combination of two coils of electric conductive material, having a power input with a flow direction, so that an intense electric field is created through the liquid containing bacteria.

The main differences with the present invention are that the apparatus here disclosed uses alternating current while the patent in question employs direct current. Also, the U.S. Pat. No. 4,572,775 patent states that the electric current flows through the fluid. The process includes a preliminary step filtration of large particles, and the apparatus comprises helical coils and its respective nucleus.

U.S. Pat. No. 8,273,251 describes a process using a feed stream fluid that flows, subject to electromagnetic pulses, and a filter element through a feed pipe inlet for the filter element. As read in this document a coil assembly is disposed in the feed inlet duct and connects a power source of AC coil assembly. Unlike the present invention, this patent relates to a system of cross-flow filtration, having a coil assembly includes switches with which the current pulses are produced and focus especially in solid-state switches (SCR Silicon-Controlled Rectifier).

U.S. Pat. No. 7,887,708, entitled "Method and device for water treatment using an electromagnetic field", describes a method comprising the steps of subjecting the water to an electromagnetic field generated by an inductive coil and varying the frequency of an excitation signal for the inductor coil, such that the electromagnetic field generated has a variable frequency.

The main differences of the present invention with the referenced patent are that in this patent varies the frequency used between 100 kHz and 500 kHz and an induction coil with a controller unit is required, this unit requires a programmable integrated circuit. The frequency range recommended to prevent algae growth with the method proposed U.S. Pat. No. 7,887,708 is between 5 kHz and 30 kHz and the range of the required current between 0.1 amperes and 10 amperes, while the frequency range preferred for water disinfection and removing bacteria is between 5 kHz and 500 kHz and the range of the required current is greater than 500 milliamps.

Analysis of the state of the art also includes U.S. Pat. No. 7,910,006, which defines a method for electromagnetic treatment of water having biological activity. The basis of this document is the principle that in the absence of an electric field, a balance exists between the hydroxyl ions and hydronium ions. If an electromagnetic field that polarizes water is applied, these two ions move independently and the equilibrium is broken. These ionic compounds may be absorbed, for example, in colloidal particles and thus a process for treating water is generated by an electromagnetic field that seeks to make the water biologically active.

The main differences of the present invention application with this patent refers to the method that is used to promote biological activity, for example, acceleration of plant growth and improve the bioavailability and efficacy of weakly diluted active ingredients, and to eliminate contamination of various types of water. In this case, a gas is used as the main element of the invention for purification of water. The frequency used is lower than 50 kHz and the power used is 1 mW/cm$^2$.

U.S. Pat. No. 8,066,886, entitled "Method and apparatus for preventative scale deposits and removing contaminants from fluid columns", describes a method and apparatus for treating fluid by pulses at a plurality of different points using pulsed magnetic energy concentrated in a plurality of different along a path of fluid flow areas. Provides a conduit (tube) magnetically conductive, an electrical conductor comprising at least one length of electrically conductive material having a first lead wire and a second wire conductor, a source of electrical energy, each power supply has a capacity for produce at least a different programmable output power continuously changing. It turns on and off at a frequency of pulse repetition to establish at least one output pulse of electricity. Different from the proposal of the present invention, this patent uses continuous current and alternating current patent comprises an apparatus for dispersing a chemical that is applied to fluid passing through the magnetic flux. Additionally, the arrangement of the apparatus and electrical circuits that generate the magnetic flux are completely different, from those cells and sections used as described herein.

U.S. Pat. No. 8,382,992 discloses an apparatus for disinfection of a fluid. The apparatus have a structure containing a fluid; this structure has a first cylindrical electrical conductive body oriented inwardly; a second cylindrical conductor of electricity facing outwards and disposed within the first body. These conductors facing each other in parallel and coaxial relation, and spaced to define a cavity that is filled by the fluid; and an electrical power source coupled between the first cylindrical body and the second cylindrical body. This power produces an electric field between them. This patent uses frequencies between 2 kHz and 5 kHz, the current is between 2 amps and 4 amps, employs pulses square waveform, the duct is coated with PVC and the applied voltage is 90V. While the arrangement of the apparatus of the present invention comprises cells and sections therefore is completely different from that proposed in the patent.

U.S. Pat. No. 8,784,667 is related with a method and apparatus for a plurality of treatment fluid comprising a first and a second fluid flow conductor not magnetically conductive sleeve within at least one segment of magnetically conductive conduit, It provides a plurality of different areas of concentrated magnetic energy. The present invention avoids the formation and accumulation of pollutants within the ducts and equipment used in transportation, delivering and processing fluid columns. Unlike the present invention, this patent uses direct current and alternating current and discloses an apparatus for dispersing a chemical to apply the fluid passing through the EMF. This patent is the original application, which U.S. Pat. Nos. 8,920,647 and 8,066,886 are derived. As with the latter, the arrangement of the present invention differs in that the device comprises cells and sections.

U.S. Pat. No. RE 43,332, entitled "Method and device for disinfecting and purifying liquids and gasses", relates to a method for disinfecting and purifying liquids and gasses comprising: a) passing liquids or gases through a reactor or combination of reactors, which have a truncated concentrator compound geometry; and b) simultaneously delivering and concentrating electromagnetic and acoustic energies diversified within a predetermined and specific interior space of said compound concentrator reactor, forming a zone of high energy density in said reactor or reactors over a period of predetermined time. The main differences with the present invention is the use of ellipsoidal concentrator, the use of photocatalytic chemical substrates such as $TiO_2$ and $SiO_2$, and the fact that the electromagnetic energy used is ultra-violet (UV) radiation. The arrangement of the apparatus of the present invention comprises cells and sections, it is completely different.

Although several patents related to the application of electric and magnetic fields for water treatment are reported in the prior state of the art, there was a need for a simple device, inexpensive that allows to handle large volumes of fluids, online, to eliminate existing pollution in wastewater. By generating strong electric and electromagnetic magnetic fields from alternating current low-voltage and low frequency, enabling the economic viability of the industrial process and ensure the complete removal of bio-contaminants, including sulfate reducing bacteria (SRB), without adding chemicals, making additional physical treatments or consume high amounts of energy.

SUMMARY OF THE INVENTION

The present invention comprises an apparatus and method for eliminating the proliferation of bacteria. In order to prevent or reduce bio fouling and/or biofilm formation on the inner surfaces of conductive or not conductive of electricity material pipes or equipment and/or industrial plants or process. And thus preventing the formation of dangerous gases for human being, animals and plants, such as sulfhydric acid ($H_2S$) produced by contaminated fluids with bacterial microorganisms. The invention uses strong electric fields and magnetic fields (EMF) induced between 1 µT and 300 µT. These EMF are generated from alternating current low voltage between 0.1 V and 12 V, preferably between 0.21 V and 2.78 V, low frequency 20-100 Hz, preferably between 20 and 60 Hz and an intensity between 5 amps and 100 amps. The generation of such electric fields are automatically controlled by a computer program (software).

The apparatus of the present invention consists of cells of pipe, preferably curved, and even better, in "U" forms, which are electrically isolated but hydraulically interconnected to allow the passage of the fluid to be decontaminated. The pipe sections and formed by several cells, which ensure that the fluid remains within the device a necessary time to apply the electric and magnetic fields and so treat the contaminated fluid.

Each cell comprises at least one first electrical conductor wire which is introduced into the inside of the pipe through a stuffing box. Stuffing box prevents the fluid leaking. This wire runs the length of the pipe to exit by another stuffing box and connects to the outside of the pipe in a nearby end of the cell point where first cable was introduced. At least one second electric isolated wire connected with the pipe near to the end where the first electrical conductor wire came outside. The two free ends of the first and second wire connectors are connected to a low voltage and low frequency AC power source.

In an alternative of the invention when the pipe is electrically conductive each cell having a first electrical conductor wire and a second electrical conductor wire.

In another alternative of the invention, the first electrical conductor wire enters the pipe several times repeating the same route described above, allowing further concentrate EMFs. In this embodiment the number of times that enters the first wire, can be repeated between 1 and 100 times the pipe, the second lead wire is one.

In a further alternative, when the pipe is not electrically conductive, the number of first conductive wires and the number of second conductive wires can be between 1 and 100 cables, being equal the number of first conductive wires and the number of second conductive wires.

To each cells, is applied the voltage that generates the current which in turn form the electric and magnetic fields. Passing through the apparatus, the fluid is subjected to these strong electric and magnetic confined fields, which are permanent or pulsed, producing pores in the protective outer membranes of bacteria, allowing external fluid to enter them to lyse and in this form, the bacteria die. With the destruction of bacteria, the formation of bio-film on the inside of the pipes carrying the fluid being treated is prevented. Once bacteria die all harmful effects are prevented.

Also, the method for water treatment by electro-magnetic fields of high intensity generated and confined in the apparatus defined above is part of the present application. This method is characterized by comprising the following steps:
a. Analyze the type of bacteria and degree of contamination of the initial sample.
b. Enter the water to be treated by point 1A,
c. Subjecting the water to be treated to EMF's where a field value from 1 µT to 300 µT is applied for a time ranging from 5 to 50 minutes, depending on the results of step a), and
d. Remove the treated water by the exit point 1B.

The sequence of powers of EMF's and the duration time of step c) are chosen based on the results of laboratory tests carried out on samples of contaminated fluid with bacteria in step a) of the method.

DESCRIPTION OF THE INVENTION

The bacteria are present in almost all human activities and industrial processes, often their presence being undesirable because they produce pollution and cause harmful effects in fluids and in the medium where they are present. Depending on the medium or container containing the contaminated fluid phenomena such as formation of bio-film and corrosion are generated. These phenomena affect the material of equipment, performance of processes and have negative implications in areas such as health and safety users or operators, and the economy, required the replacement of machinery, among others.

The present invention is directed to eliminate the proliferation of bacteria. Bacteria elimination prevents or reduces bio-fouling or formation of bio-film in pipes, industrial equipment. And prevent the formation of dangerous gases such as $H_2S$ and $CO_2$. These gases are dangerous for the human, animals and plants.

The apparatus and method for microbiological control of fluids in pipes of the present invention are based on the generation of electric and magnetic fields from alternating electrical current using low voltage and low frequency. Passing through the apparatus, the fluid is subjected to strong, confined and permanent or pulsed electric and magnetic fields (EMF's). These EMF's, produce pores in the protective outer membranes of bacteria, which allows external fluid to enter them to lyse and thus, the bacteria die. With the destruction of bacteria, formation of bio-film on the inside of the pipes carrying the fluid being treated is prevented. Preventing all harmful effects these type of bacteria pollution generate.

The apparatus of the present invention is comprised of a set of cells (21) of pipe (2), preferably curved, and even better, in a "U" form, and sections (22) formed by several cells (21) arranged or connected hydraulically in series, to which is applied an alternating electric current of low voltage and low frequency. Cells are separated by electrical insulation joints (10A), but hydraulically connected together as shown in FIG. 1, where a device with 4 sections (22), each section with eight cells (21) are represented.

Figure 1:
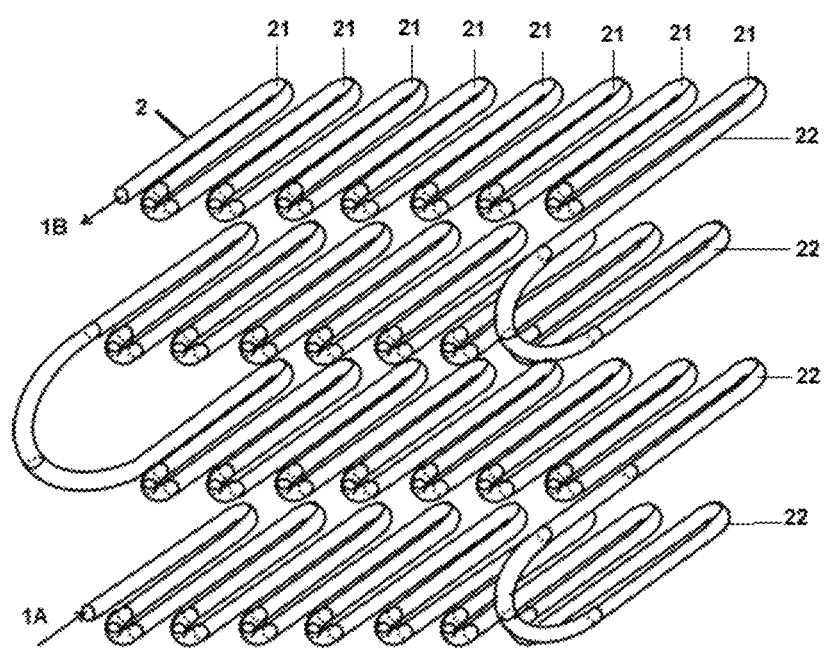
FIG. 1 Shows the arrangement of the apparatus of the present invention illustrating how the cells (metal tube in a "U" form) and sections (union of several cells) are arranged to form the apparatus. The fluid to be treated enters through the element 1A and exits the element 1B.

The fluid to be decontaminated enter through point 1A, it passes through the cells (21) of the different sections (22) and gets out by the point 1B, as shown in FIG. 1. Ensuring their retention in the apparatus the necessary time to apply the electric and magnetic fields required to reduce the amount of bacterial contaminants.

One of the main features of the present invention is the electrical connection of the cells. The generation of high magnetic induction between 1 μT to 300 μT, required to kill bacteria in the contaminated liquid, depends on the electrical connection way of the cells.

Figure 2:
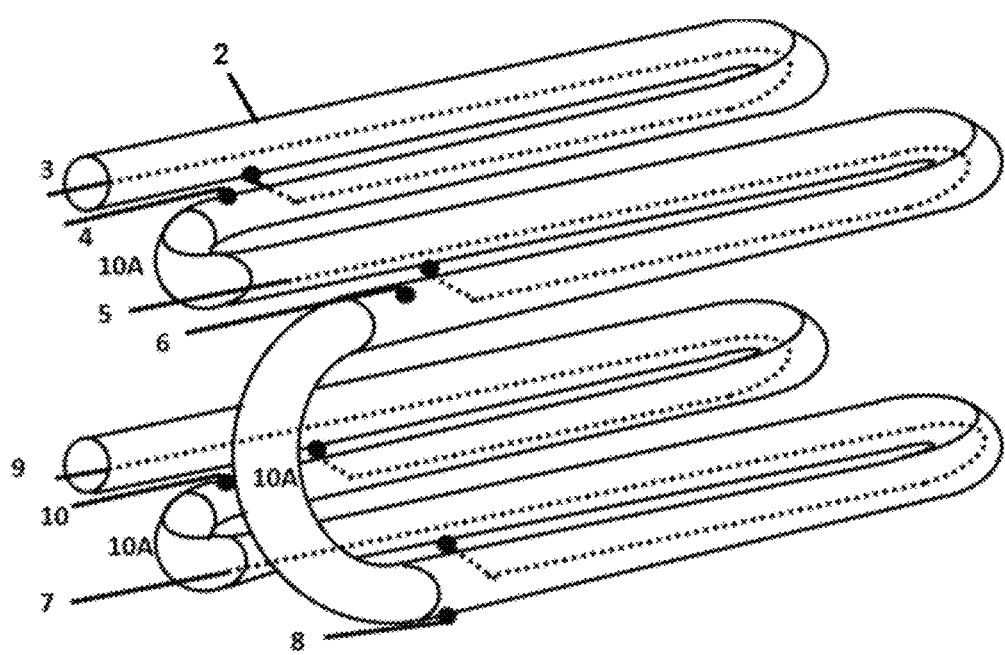
FIG. 2 Show hydraulic connections and electrical circuits that generate electric and magnetic fields as connected in the cells and sections.
Figure 3:
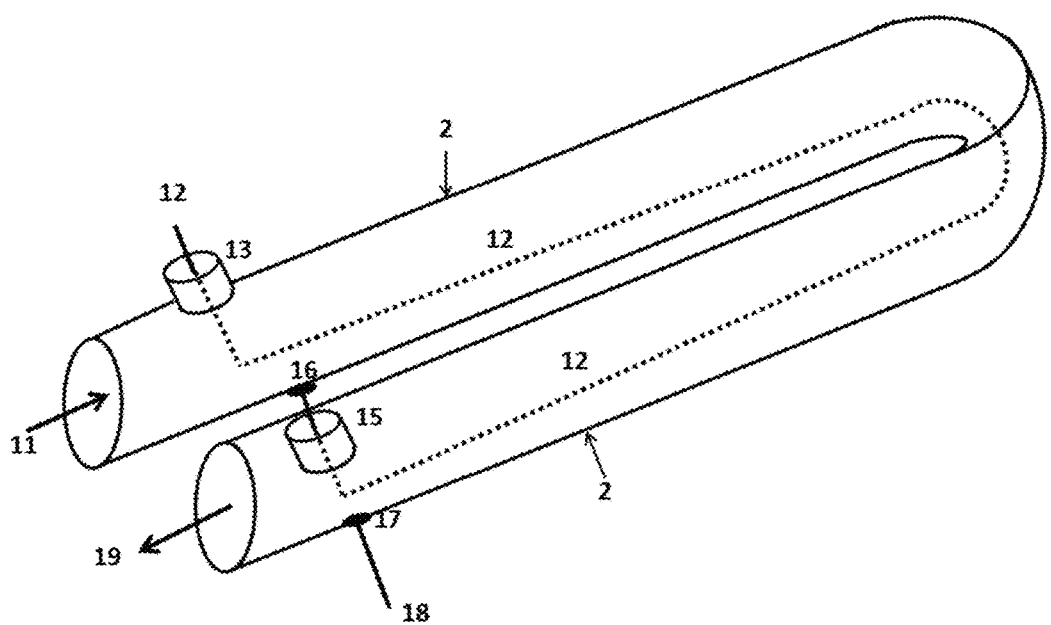
FIG. 3 Illustrates in detail the electrical connection for each cell.

FIG. 2 shows the electrical connections and circuits as they are connected in the cells and sections. Current inputs to the isolated wire from the source of alternating electrical current, correspond to the cables 3, 5, 7, 9, while wire cables 4, 6, 8 and 10 are connected to the outside of the pipe. In each cell the free ends of wires are connected to a source of low voltage and low frequency Alternate Current. Cells are separated by electrically insulating joint (10A) which is made of insulating plastic material sections with sufficient mechanical strength to withstand the pressure of fluid flowing through the apparatus. The number of sections is designed according with the necessary residence time of the fluid in the apparatus. With this arrangement of cells (21) and sections (22) in a small space can be build all the hydraulic circuit that allows the fluid have the residence time necessary to ensure that when leaving the apparatus the bacterial load has been effectively eliminated. As seen in FIG. 3, each cell (21) comprises at least a first electrical wire conductor (12) inserted in the inside of the pipe (2) through a stuffing box (13), which prevents the fluid to leak. This first wire (12) runs the length inside of the pipe (2) and gets out through another stuffing box (15) and connects to the outside of the pipe (2) at a point (16) near the end of the cell (21) where the first cable was inserted (12). And at least one second wire insulated electrical conductor (18) is connected

(17) to the outside of the pipe, near the end where the first wire electrical conductor (12) was inserted. And a source of alternating low voltage and low frequency current (30), to which the two free ends, the first cable (12) and the second cable (18) are connected. The current source (30) is controlled by a computer program (software), which can vary the intensity and time of exposure to electric and electromagnetic fields.

In an alternative of the invention when the pipe is electrically conductive each cell has a first cable and a second electrical conductor electrically conductive wire, as shown in detail in FIG. 3.

In another alternative of the invention, the first electrical conductor wire enters the pipe several times repeating the same route that was described above, allowing further concentration of EMF's. In this embodiment the number of times that enters the first wire, can be repeated between 1 and 100 times the pipe, the second wire is only one.

In a further alternative, when the pipe is not electrically conductive, the number of first conductive wires and the number of second conductive wires varies between 1 and 100. Therefore, the number of first conductive wires and the number of second conductive wires are equal.

As explained in detail ahead, the arrangement of the electrical connection defined above is the one that ensures that the apparatus of the present invention can generate strong and confined EMF's between 1 µT to 300 µT. This electrical connection allows a low power consumption of the order of 10 to 60 W/m. Electric and magnetic fields (EMF's) generated by electric current through wires (12, 18) and the pipe (2) are distributed along the tube on the inside of the pipe (2) and on the outside of the cable (12) that goes inside the pipe.

The present invention employs a supply of AC power (30) capable of providing a programmable output power that can flash on and off, thereby energizing the wires (12, 18) and the tube (2) containing the fluid to be treated. The electromagnetic discharge can be permanently or pulsating, as need, and is set and controlled by a computer program (software).

By applying the alternating electric voltage in each cell (21), confined high power EMF are generated inside the pipe (2) and acting on the bacteria that is carried by the fluid to be treated. These EMF's are capable of destroying the outer membranes of bacterial cells, causing damage to the cell wall, which ultimately cause lysis of these organisms.

Figure 4:
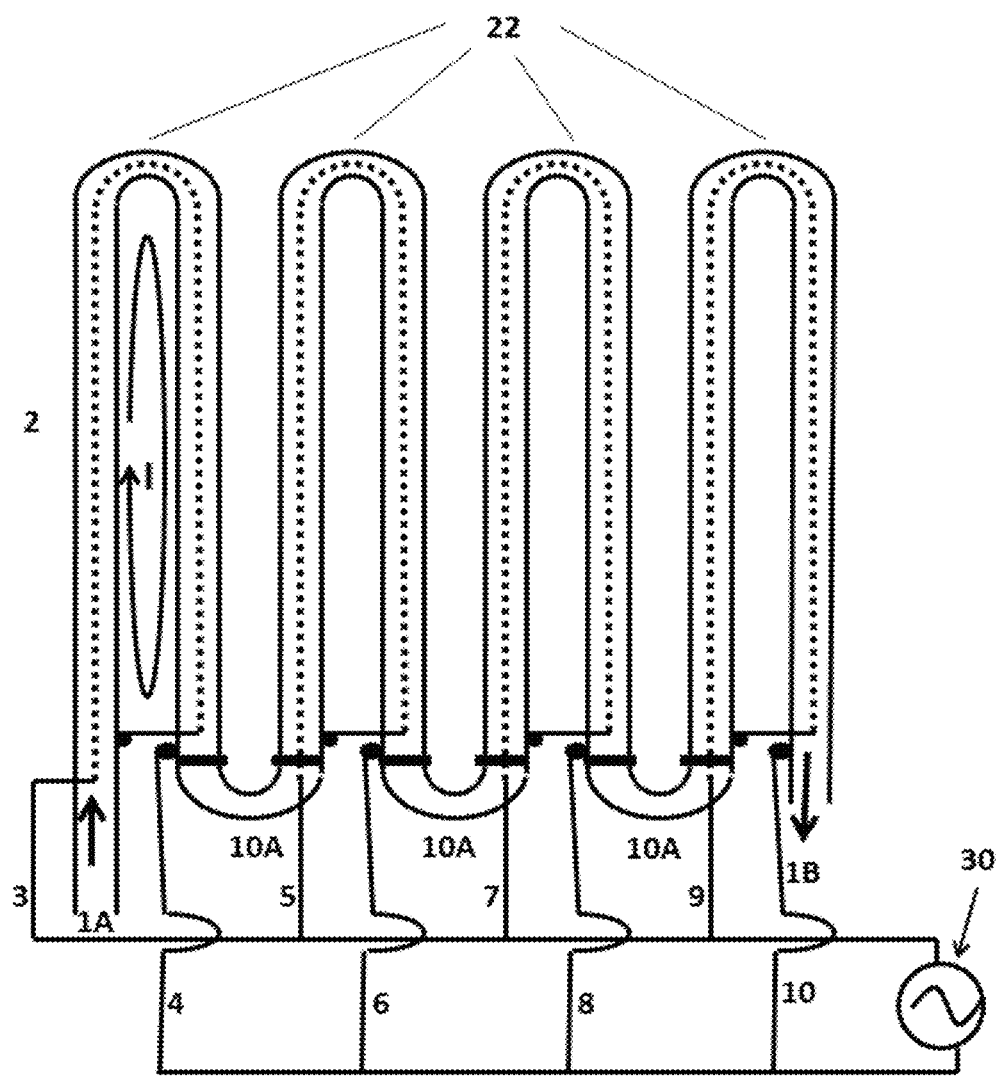
FIG. 4 Show the hydraulic and electrical connection of the cells in a section of the apparatus. The direction of the electric current, indicated as I, while the direction of flow of the liquid enters by the point 1A and exits by the point 1B.

The arrangement of multiple cells (21) and sections (22) of pipe (2) in series implies that EMF's generated in each cell (21) and section (22), as illustrated in FIG. 4 produces a reinforcing effect. For organisms that are not lysed in the first cell, they are destroyed in the following cells or in the cells of the next section, eliminating residual bacteria that survived the passage through the previous sections and making more effective the method. At the end of the array, the flow goes without the bacterial load, because the bacterial load has been destroyed.

Added to the apparatus, also is part of the present application the method for water treatment by confined EMF of high intensity, produced in the apparatus defined above. The method is characterized by comprising the following steps:
  a. To analyze the bacteria type and degree of contamination of the initial sample,
  b. Enter the water to be treated by point 1A
  c. Subjecting the water to be treated to a EMF's from 1 µT to 300 µT for a time ranging from 5 to 50 minutes, depending on the results of step a), and
  d. Remove the water treated by the exit point 1B.

Specifically, step c) of the method for water treatment of the present invention comprises one, two, three or four of the sub-steps specified below:
  c1. Subject the water to be treated to a sub-stage of a constant EMF, with a value from 1 µT to 300 µT, continuously applied for a defined time ranging from 5 to 50 minutes,
  c2. Subject the water to be treated to a sub-stage oscillating EMF, which consists of applying a fixed value of EMF ranged from 1 µT to 300 µT, for a first period of time followed by a suspension of the EMF during less than the half of the time of the first period (for example, apply 40 µT EMF for 20 seconds, and suspend for 5 seconds), repeat the previously steps up to complete a treatment between 5 and 50 minutes.
  c3. Subject the water to be treated to a sub-stage of ascending Multi-EMF, which applies a series of EMF's in ascending form, where the value of such ascending fields between 1 µT to 300 µT, each EMF can last between 5-10 minutes; to complete a total treatment of 5-50 minutes, and/or
  c4. Subject the water to be treated to a sub-phase alternating Multi-EMF, during which a number of EMF's are applied alternately, in it a fixed EMF value between 1 µT to 300 µT, it alternates with the application of EMF values ascending from 1 µT 300 µT and cycles are repeated. The application of each EMF, may last a few minutes, to complete total time between 5 and 50 minutes The sequence of steps and sub-steps, the powers of the EMF's and times for each stage are chosen based on the results of laboratory tests carried out on samples of contaminated fluid with bacteria during step a) of the method.

In a preferred embodiment, the value of the field in the sub-stage mono constant EMF c1) is 60 µT and 80 µT and this remains constant for a period between 5 and 50 minutes. Preferably, the value of the field at this stage is 60 µT and applied for a time of 20 minutes.

Likewise, the value of the field in the mono oscillating field sub-step c2) is 60 µT and 80 µT. This EMF is applied during 10 to 15 seconds, and then the application of the field is suspended for 5 to 10 seconds and is successively repeated until a total treatment of 25 to 35 minutes. Preferably, the value of the field in this sub-stage is 60 µT and applied for 15 seconds, then the application of the field is suspended for 5 seconds and so on, for a total time of 5-50 minutes.

In the sub-step up Multi-EMF c3), a series of EMF's are applied in ascending order. It can start with a value of 40 µT, followed by applying a field value of 60 µT, and then one of 80 µT and finally, one of 100 µT, each EMF, can last between 5 and 10 minutes; to complete a total treatment of 5-50 minutes.

As for the values of the multi-field alternating sub-step c4), it has been determined that in this sub-step a series of EMFs are applied alternately, a particular value between 1 µT to 300 µT is chosen. This value is alternated with other ascending values rising from 1 µT to 300 µT. For example, the constant set value is 40 µT, alternating EMF values of 10 µT, 20 µT, 60 µT, 40 µT, 80 µT, 40 µT, 100 µT, 60 µT, 120 µT and so on can be applied. The duration of each EMF, can last between 5 and 10 minutes, and these cycles are repeated until a total of 5 to 50 minutes.

The method is based on the fact that microorganisms (bacteria) that the fluid brings are subjected to variable stresses following the Lorentz law, when they pass through the generated EMF.

Figure 5:
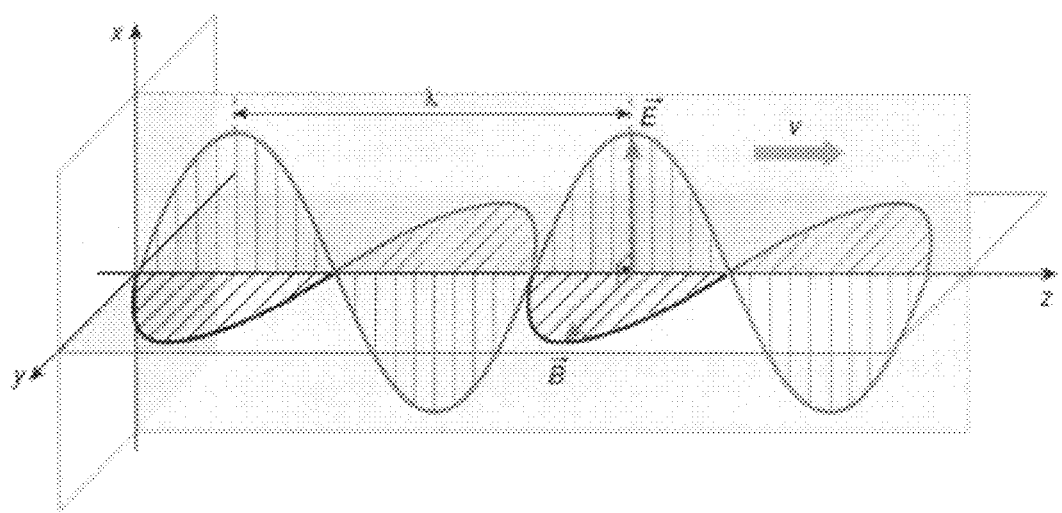
FIG. 5 Illustration of the components of electromagnetic fields (EMF).

According to FIG. 5, for a particle subject to a combined electric field with a magnetic field, the total electromagnetic force or Lorentz force on the particle is given by the equation:

$$F = q(E + v \times B) \quad (1)$$

Were:
- q=particle charge
- v=velocity of the particle
- E=vector of electric field intensity
- B=Magnetic induction vector The tube on its inner surface carries a large amount of electrons (alternating electric current between 5 and 63 amperes) due to the effects of Eddy currents, skin effect and double layer (Helmholtz—Gouy—Chapman—Stern). So in the inside of pipe there are a lot of electrons near the surface available to be shared with membranes of bacteria, exciting its surface and producing the phenomena of electroporation (opening pores of the bacterial membrane) and lysis (rupture) which destroy bacteria membranes.

Because the effect of EMF, the direction followed by the bacteria will have a helical and tangentially way relative to the direction of flow, as long as the magnetic fields are strengthened, this occurs inside the pipe leading the fluid to be treated.

In reinforced magnetic fields (vector sum) as those achieved with the arrangement of the electrical connection of the present invention, the movement of bacteria will be rotational—helical and come into contact with the inner walls of the pipe. The inner wall of the pipe has an electric field with high electron load (high current). By the potential difference between the inner walls of the pipe and the membranes of bacteria, the membranes of the bacteria will be subjected to electroporation and bioelectrical effects. The result of these effects will be the rupture of the membrane that protects the bacteria.

Around the inner wall of the pipe a highly positive layer is formed, which captures the bacteria (the membrane is negative), due to AC there are changes of polarity (alternate current of 60 Hz/second), and therefore the charge of the membrane is altered. The bacteria membranes are subject to these continuous efforts and therefore appear the membranes fatigue. Continuous efforts can produce electroporation (pores increase). If the current is allowed to flow a short time and it is suspended, the electroporation effect can be reversed and the membrane can go back to its normal operating condition. If the EMF last a long time, between 5 and 30 minutes, the membrane elasticity is lost and reaches a state of breaking (lysis). Having lysis, the internal fluids of bacteria emerge out from the membrane (or external fluids gets in) and the bacterium dies.

It should be noted that the most appropriate current intensity, where the highest ratio of force is exerted, according to the experiments conducted in the laboratory, is between 10 amps and 30 amps.

To determine the intensity of the electric and magnetic fields (EMF) to design a method that kill bacteria, several laboratory tests should be made, with different intensities of current (amps) and times. This is necessary, because the bacteria have different kinds of membranes. Generally Gram positive bacteria have a single membrane (cytoplasmic) and Gram negative bacteria have two (outer and cytoplasmic membranes).

There are many bacteria genera which coexist together (Gram positive and Gram negative). For example, in a sample may live together: bacteria that generate gases ($H_2S$—*Desulfovibrio* spp), bacteria that form biofilm (*Pseudomonas* spp), bacteria that form endospores (*Clostridium* spp) and bacteria that produces acid (*Thiobacillus* spp). Considering this variety of microorganisms living together, the question is not to treat a single genus, the success is to kill all of a conglomerate of bacteria and therefore laboratory tests are essential to the knowledge of the intensity of EMF to be used to remove the bacterial load of the fluid to be treated.

The apparatus developed in the present invention, allows to keep confined electro-magnetic fields (EMF) of high intensity, using low voltage and low frequency permanently or pulsating alternating current, which are applied to the fluid passing through the pipe subjected to electromagnetic fields generated by this invention. The EMF method developed here can be applied to fluids that enter to a process or going out of a process which are required to be free of bacteria. The EMF's are applied to the pipe through which passes the fluid to be treated in a permanent or pulsed manner, as required.

High confinement, intensity and persistence of EMF generated penetrates the protective outer membranes of bacterial cells by the effects of electroporation and bioelectricity. Under these effects microorganisms are unprotected and internal components of the bacterial cell are exposed to the surrounding fluid (lysis). Lysis does not allow the bacteria to survive. Therefore, in absence of microorganisms, there are not source of biofilm formation and gases such as $H_2S$, $CO_2$ etc. on the inner walls of the pipes that carry the treated fluid by the system described herein. It is recommended to treat the fluids by this invention before entering to a process that can help the development of biofilm.

DETAILED DESCRIPTION OF THE INVENTION

Example 1: Behavior of EMF in a Section of the Apparatus of the Present Application To demonstrate the importance of the connection arrangement, in FIGS. 6A to 6E a schematic representation of the EMF performance in a section of the apparatus in the present application is made. Where Rt=pipe resistance, Rc=wire resistance. V=voltage, $\vec{B}$ B=insulated electrica $\vec{E}$ conductor, CD=metal pipe, I=current, B=magnetic field, E=electric field, ~ =AC source, =transformer.

The direction and power of EMF's depend on the way the conductor cable and the pipe carrying the fluid to be treated electromagnetically to control the bacterial content are connected. FIG. 6A represents a cell (21), where the arrangement of the electrical connection apparatus of the present application is shown. Applying an AC voltage between points A and D so that the electric current flowing through the insulated electric wire (12) between points A and B through the resistance Rc (resistance of wire), then the electrical current flows through the pipe between points C and D through the resistance Rt (resistance of the pipe), an equivalent electrical circuit is indicated in FIG. 6B.

The direction of the magnetic field generated by current passing through the insulated electric wire (12) going inside the pipe is shown in FIG. 6C. The direction of the magnetic field generated within the pipe is shown in FIG. 6D. Therefore the tangential force of these magnetic fields is reinforced and the resultant of magnetic fields generated by the passage of electric current will have the direction shown in

Figure 6:
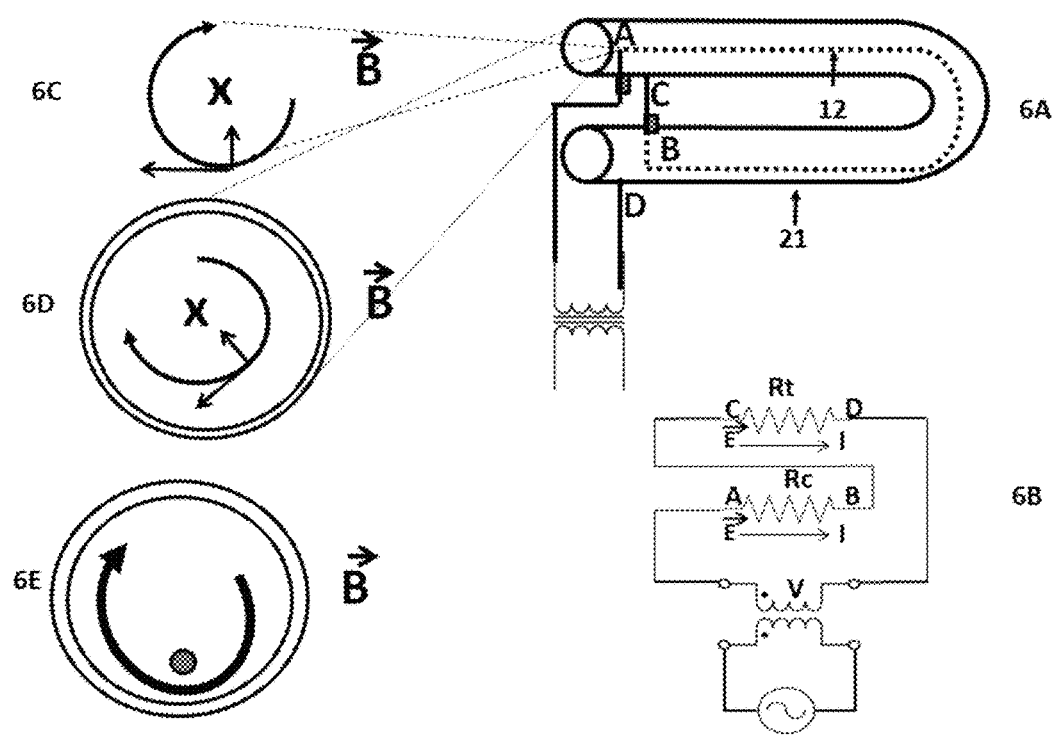
FIG. 6A Electrical connection for each cell according to the present invention.
FIG. 6B Electrical circuit equivalent to the connection illustrated in FIG. 6A
FIG. 6C Direction of magnetic field generated by current passing through the insulated electric wire (12) going inside the pipe (21), as shown in FIG. 6A.
FIG. 6D Direction of magnetic field generated inside the pipe shown in FIG. 6A.
FIG. 6E Final result of the magnetic fields direction generated by the passage of electric current in FIG. 6A.

FIG. 6E. The net force exerted by the action of EMF generated inside the pipe, is helically centrifuged shaped to the inner wall of the tube.

When the bacteria within the fluid to be treated, penetrate the developed EMF, they receive a centrifugal force that pushes them to the inner tube surface. This surface is very large compared with the outer surface of the inner cable. It should be noted that the inner tube surface is under an electric field, because the tube is part of an electrical circuit and electrons circulate through it, due to the applied voltage.

Passing through the EMF generated by the alternating current, microorganisms (bacteria) within the fluid are subjected to variable stresses, following the Lorentz law (Equation 1). Those forces generate stress over membrane of the bacteria. These stresses generate porous openings without bacteria control, and carries to cellular lysis.

Figure 7:
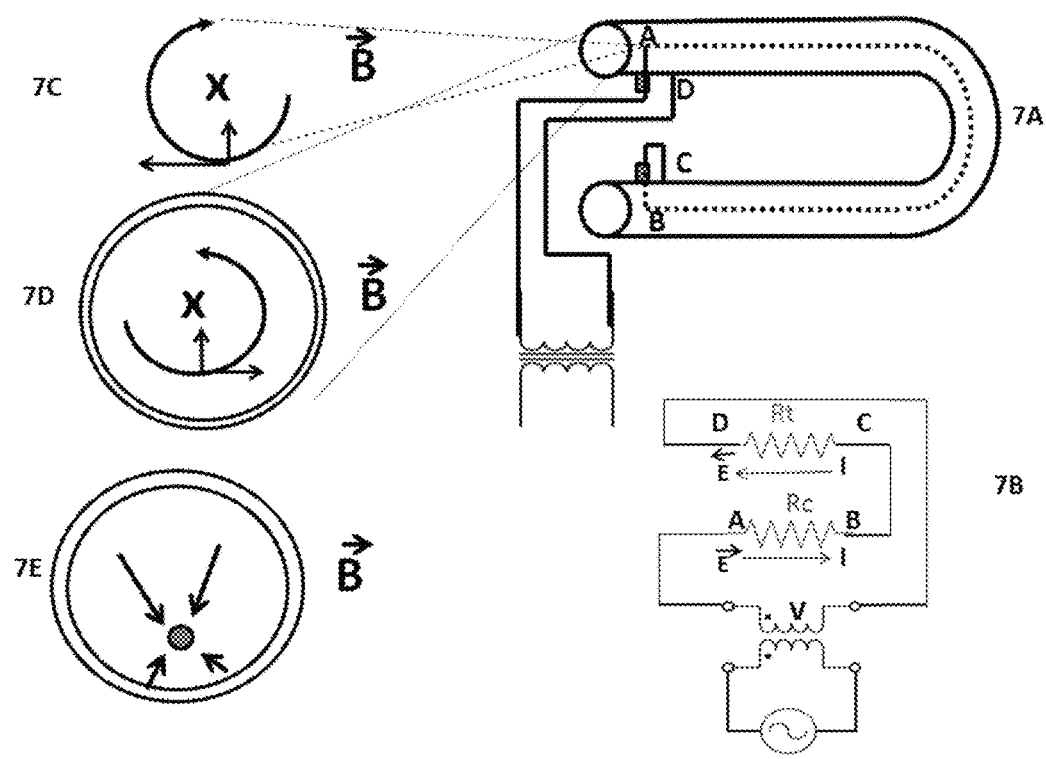
FIG. 7A Electrical connection for each cell according with the closest prior state of the art.
FIG. 7B Electrical circuit equivalent to the connection shown in FIG. 7A.
FIG. 7C Direction of the magnetic field generated by the current passing through the isolated electric cable running inside the pipe, as shown in FIG. 7A.
FIG. 7D Direction of magnetic field generated inside the pipe shown in FIG. 7A.
FIG. 7E Final result of the direction of the magnetic fields generated by the passage of electric current in FIG. 7A.

Example 2: Performance of EMF in a Section of an Existing Apparatus in the Prior State of the Art The closest prior state of the art has a connection between the electrically conductive cable that goes inside and the pipe equivalent to the connection shown in FIG. 7A. Therein the electric circuit is equivalent to that shown in FIG. 7B. In this arrangement the flow of the current is reversed through the pipe. The alternating electrical current enters through A, passes through the electrical conductor that goes inside the pipe to B and then electrical current enters the tube in C, and makes the journey through the pipeline to the point D. The direction of magnetic field generated by current passing through the electrical conductor wire (inside the pipe) will be the shown in FIG. 7C. The direction of the magnetic field generated within the pipe will be the shown in 7D. As it can be seen tangential force of these magnetic fields is canceled and the resultant of the magnetic fields will have the direction shown in 7E. The net force exerted by the magnetic field is oriented to the electrical conductor which is inside the pipe.

When the bacteria contained in the fluid penetrate the developed magnetic field, they feel a centripetal force which pushes them to the surface of the inner electrical conductor. The inner conductor is bare (uninsulated), the electric field can take effect on bacteria. The contact area in this case with bacteria is much lower compared with the internal area of the pipe.

Figure 8:
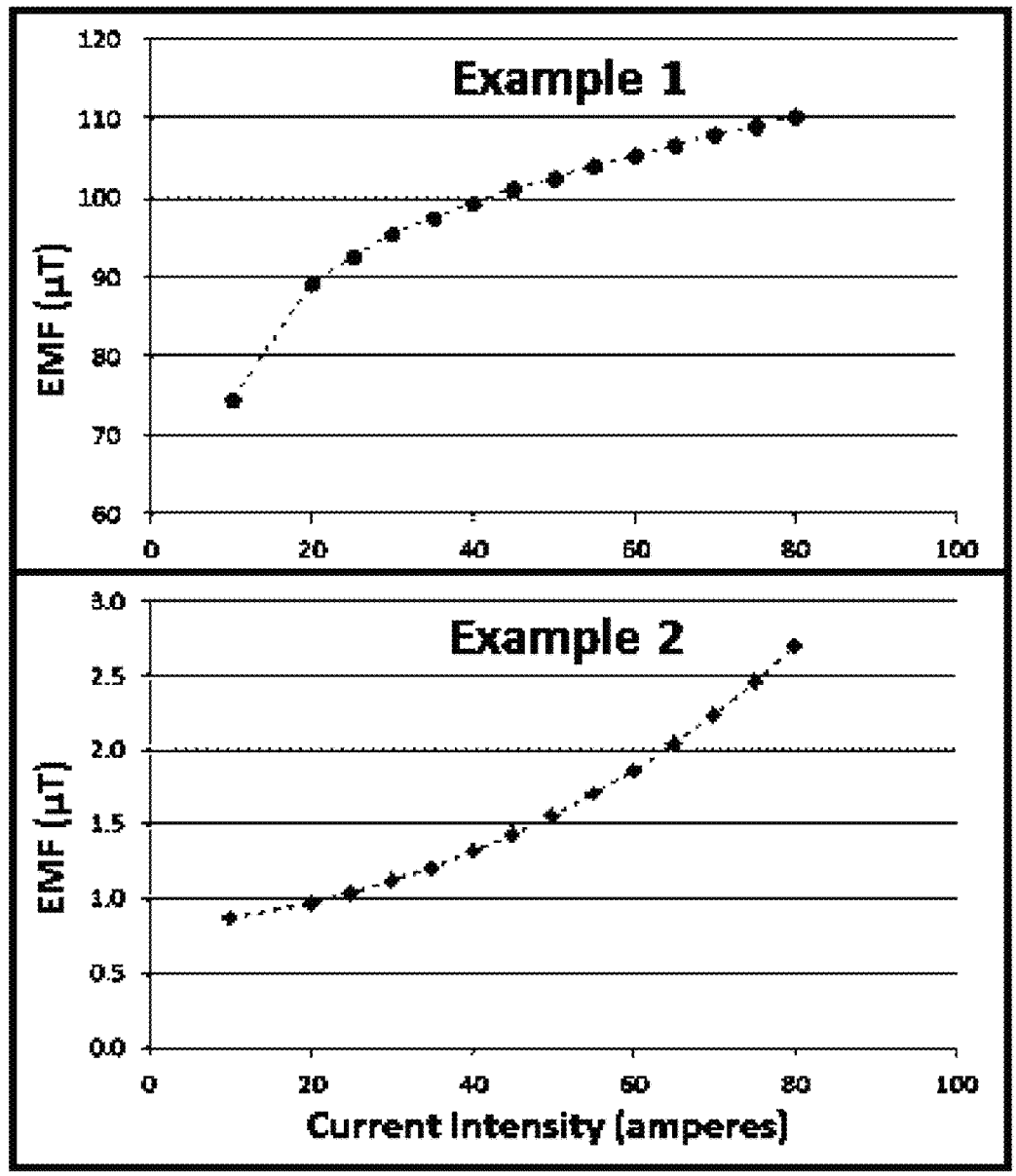
FIG. 8 EMF's Intensity according to connection of the present application and the state of the art connection, according to Examples 1 and 2, between the pipe and the inner insulated wire electrical conductor.

FIG. 8 shows the intensity of EMF's with the connection of the present invention, where currents between 10 to 40 amperes generate electromagnetic fields between 70 µT and 100 µT (upper graph—Example 1). While applying the same intensity, from 10 to 40 amps, in the connection of the state of the art (lower graph—Example 2), it produces magnetic inductions that do not exceed 1.5 µT.

Example 3: Test Apparatus and Method at the Laboratory Level

To proof this invention an apparatus and method at laboratory level was developed, it was found that due to the low resistance of the conductor and the piping (Rt=7.2 milliohms; Rc=36.65 milliohms) when the applied voltage ranged between 0.21 and 2.78 V, a high electrical current flows, in the order of 5-63 amps. This current generates electromagnetic fields (EMF) with high power between 51 µT and 104 µT, which are confined within the pipe. These EMF's induces electroporation and bioelectric phenomena that destroys the membranes of bacteria that carry the fluid to be treated.

Figure 9:
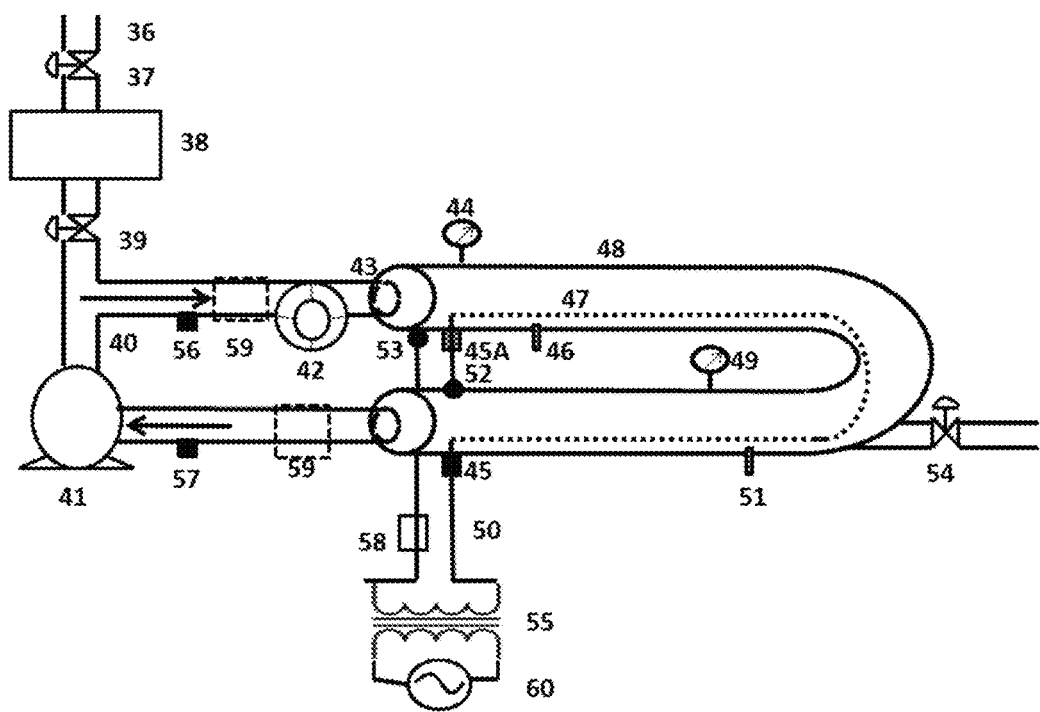
FIG. 9 Diagram of the apparatus of the present invention manufactured at a laboratory level.

In the laboratory equipment, see FIG. 9, the microbiologically contaminated fluid enters the inlet (36) and ensures no contamination of the environment by means of valve (37). Within the tank (38) remains the contaminated fluid ready to enter the hydraulic circuit, where the EMF is generated. The valve (39) ensures that there is no mixing of the fluid being treated and the fluid that is waiting to enter the treatment system.

Once the fluid enters into the treatment cell, it passes by pipe (40, 48), pump (41), accessories (43) and flows into the hydraulic circuit the required time. To control variables such as flow rate, there is a flow meter (42), for measuring the temperature two temperature sensors (46, 51) one on top (46) and another at the bottom (51). To measure the pressure, two pressure gauges, one at the top (44) and the other at the bottom (49) were installed. The flow direction is indicated in arrows. There are two sampler points (56, 57) to get fluid samples without stopping or opening the equipment.

A portion of cable (50) is connected to a terminal of the AC power (55), then the isolated electrical conductor cable is passed by a stuffing box (45) and continues its journey through the inner tube (47) and exits by another stuffing box (45A) and it is connected to the outside (external part) of the tube (52). The other terminal of the transformer (55) is connected to the outside of the pipe (53) near by the cable outlet (45A stuffing box). In this last cable is fitted a current intensity meter (58). The cell is electrically insulated by electrical insulation joints (59). The transformer (55) is connected to a source of AC power (60).

Signals from sensors measurement of temperature, pressure, flow rate, current, the positions of off and on of the pump and the speed thereof, are sent to a data card collector, this information is send to a computer program (software). The computer program makes adjustments according to the parameters that have been selected for the laboratory testing. The computer connects and disconnects the different coils of the transformer, via a series of relays that are managed by a control card which is actuated by signals from the computer, according to the test program.

The definition of the test parameters is made before to carry out the operation. Once the test is started, the system can abort the test in case of emergency decided by the operator. While the test is running, all valves are closed and the pump is running.

Samples of the fluid that is inside the pipe, can be taken by points 56 and 57 (samplers), to check for bacteria presence. This procedure is done with disposable syringes. The whole area around the equipment should be clean and free of obstacles. The power supply circuits are reviewed prior to the connection of laboratory equipment. All this procedure is made following testing protocols previously designed, according to the test to be performed.

At level of laboratory, tests have been conducted with injection water of two Colombian oil fields and good results have been achieved in the microbiological control of Sulfate Reducing Bacteria (SRB). After 14 days of incubation, culture vials taken from treated water, showed no presence of these bacteria in the waters of both fields, while in this time period, the control vials (without treatment with EMF) showed the presence of the SRB.

Genes of sulfate reducing bacteria that were found in the injection water in the first field were:
*Desulfovibrio* spp,
*Desulfovibrio gigas,*
*Desulfococcus* spp,
*Desulfovibrio gracilis,*
*Desulfobacter* spp,

*Desulfovibrio vulgaris,*
*Desulfovibrio desulfuricans,*
*Desulfovibrio aerotolerans.*

Genes of sulfate reducing bacteria that were found in the injection water in the second field were:
*Desulfovibrio vulgaris,*
*Desulfovibrio desulfuricans*

Table 1 shows the registration form and one laboratory tests carried out with the EMF generator equipment on samples of injection water from the first oil field.

EMF intensity applied in this case was 100 µT. The voltage applied to the circuit pipe—insulated electrical wire conductor in the range of 0.5 volts and the current intensity was between 38 and 39.2 amperes (see Digital column in table 1). During the development of the test several samples of the treated fluid were taken (8 witnesses samples) at time intervals of 6 and 3 minutes and the volume of each sample taken was 2 cm³. A witness sample of 1 cm³ was left at constant temperature of 37° C. (optimum temperature for growth of SRB) in an incubator and the other witness samples of 1 cm³, were left at room temperature (22° C. to 30° C.). By observing the results of this test after 14 days of bacteria incubation, no bacterial growth of SRB was registered in the samples of water treated electromagnetically with the equipment developed in this invention.

tation of the method claimed herein, ensuring the destruction or at least, reduction of most existing contaminating bacteria in the treated water.

Example 4: Tests to Verify the Influence of the Diameter of the Pipe in the Results The test described in example 3 was evaluated by applying 1 µT in small pipes, a quarter inch of diameter, and with times of 30 minutes; after 26 days no growth was detected of SRB on taken samples.

When the pipe diameter was increased to 2 inches, more power in EMFs was required.

In the static tests that were conducted in 4-inch pipe, the require EMF reached up to 300 µT and after 33 days growth was detected only in the control vials (0 EMF's) and in the vial of 10 minutes under EMF's. In other vials (15, 20, 25 and 30 minutes under EMF), the sulfate reducing bacteria did not growth.

Example 5: Application of this Method and Apparatus on an Industrial Scale in a System of Microbiological Control of an Injection Water System in an Oil Field The following explains the steps for designing a system of microbiological control in water injection for an oil field.

TABLE 1

Test record conducted with water of the fist field
LABORATORY TEST LOGS

Date: 5 Nov. 2014   Start: 5:03PM   Participants: Luis Rueda, Jorge Jaimes, Bernardo Silva
Fluid: Water of injection First field   Finish: 5:47PM   Voltaje Application: Continuos (all the time)

| Pump yes | Operation: Automatic | | | VIAL | | Program | | | T(° C.) | |
|---|---|---|---|---|---|---|---|---|---|---|
| | TIME(SEC) | | | | | | | | | |
| | Parcial | Minut | cumulate | CC | CardRe | V | A | | Card | analog |
| | | | | 0 | 2 | | | | 27 | 27 |
| | 60 | 1 | 60 | 1 | 2 | 0 | 0 | 0 | | |
| | 360 | 6 | 420 | 2 | 2 | 2 | 0.5 | 39 | 29 | 30 |
| | 360 | 12 | 780 | 3 | 2 | 2 | 0.5 | 40 | 31 | 30 |
| | 360 | 18 | 1140 | 4 | 2 | 2 | 0.5 | 40 | 32 | 33 |
| | 360 | 24 | 1500 | 5 | 2 | 2 | 0.5 | 39 | 33 | 34 |
| | 180 | 27 | 1680 | 6 | 2 | 1.9 | 0.5 | 39 | 34 | 35 |
| | 180 | 30 | 1860 | 7 | 2 | 1.9 | 0.5 | 39 | 34 | 36 |

| Pump yes | Digital A | Manom Psig | Voltim V | Pulse No | Vinput | Remarks | Nomenclature viales | Growth Verification at 14 days |
|---|---|---|---|---|---|---|---|---|
| | | | | | | Recipient-witness 0 | CYC-0-0-0 | Positive |
| | | | | | | witness1-EMF equipment | CYC-1-1-T1 | Positive |
| | 39.1 | 0 | 13 | No | 120 | witness2-T2 | CYC-2-6-T2 | Negative |
| | 39.2 | 0 | 13 | No | 119 | witness3. Computer program get loss. Computer is restarted test start again at 5:23:30 and ends at 5:47:48 | CYC-3-12-T3 | Negative |
| | 38.9 | 0 | 13 | No | 120 | witness4 | CYC-4-18-T4 | Negative |
| | 38.5 | 0 | 13 | No | 118 | witness5 | CYC-5-24-T5 | Negative |
| | 38.2 | 0 | 12.7 | No | 117 | witness6 | CYC-6-27-T6 | Negative |
| | 38 | 0 | 12.6 | No | 117 | witness7 | CYC-7-30-T7 | Negative |

Figure 10:
FIG. 10 Results after 14 days of the Water treatment of Oil Field 1 with the apparatus and method of the present invention.

Complementing this information. FIG. 10 shows the results of treatment after 14 days. As can be seen, the corresponding vials T2 to T7 remain without bacterial growth after 14 days after the treatment. These results show without doubt the effect of electro-magnetic fields generated in the apparatus of the present invention and the implemen- Step 1. Characterization of the Fluid Based on laboratory tests, it was determined that the bacterial content of the fluid are sulfate-reducing bacteria (SRB). *Desulfovibrio desulfuricans Desulfovibrio vulgaris* ($H_2S$ producers) among others were found.

Step 2. Laboratory Tests to Determine the Intensity of EMF.

In laboratory tests with the laboratory equipment of this invention it was determined that the SBR are eliminated with EMF OF 99 µT and a retention time (treating time) of 6 minutes.

Step 3. Design of the Field Equipment

Data:

| | |
|---|---|
| Flow of water to be injected into the well: | 159 m³/day |
| Residence time (treating time): | 6 minutes |
| Outside pipe diameter: | 6.0325 cm Sch. 40 |
| Pipe Material: | Carbon steel |
| Material of insulation joints: | plastic pipe with 6 cm of inner diameter with pressure capacity of 140 kPa (kilopascals) |

Design Results:

| | |
|---|---|
| Length of pipe with EMF: | 384 meters |
| Number of Cells: | 32 |
| Length of each cell: | 12 meters |
| Number of sections: | 4 |
| Cells per section: | 8 |
| Pressure drop: | 64 kpascals |
| EMF: | 99 µT |
| Electric power: | 10 W/m |
| Frequency: | 60 Hz |
| Intensity: | 30 A |
| Design Factor: | 1.2 |
| Requiere Electric power: | 4.2 kWh |

Equipment dimensions according to FIG. 1:

High 2.00 meters, Width 2.50 meters, Length 7.5 meters

As shown in this example, the equipment to treat 159 m3/day has reasonable dimensions (see dimensions of the equipment). The cost of water microbiological control using EMF is approximately US$841 approx. per month. Using biocides treatment of this water per month is about US$4.765 (March/2015). Table 2 shows the calculation of these values per month. These values are estimated for Colombia territory.

TABLE 2

Comparison of operating costs per month for microbiological control using EMF and biocides.
Microbiological Control Comparison

| EMF | | Biocide | |
|---|---|---|---|
| m³/day | 159 | m³/day | 159 |
| m³/month | 4,834 | m³/month | 4,834 |
| Kwh | 4.2 | ppm biocide | 70 |
| Kwday | 101 | m³ of biocide | 0.34 |
| Kwmonth | 3,024 | US$/m³ of biocide | 13,209 |
| US$/kwh | 0.18 | Cost biocide/US$ | 4,469 |
| | | Pesos/US$ | 2,700 |
| Supervisory | 296 | Supervisory | 296 |
| US$/month | 841 | US$/month | 4,765 |

During the planning of the laboratory tests, current intensity to be applied to the pipe and to the isolated conductor cable is selected, times during which the current will be applied and the number of samples that should be taken.

The invented apparatus has relays that control the output of different current transformer and these currents are applied to the cell treatment.

FIG. 8 was built base on several laboratory tests made with the apparatus of this invention (FIG. 9).

The values to be applied (current, time, sampling), are entered into the computer program (software). The program places these values in a database. After starting the test, the program is synchronized with the time reading (via computer) and the pump is turned on, to put to circulate the fluid to be treated. The apparatus includes a data card that takes the information from the sensors that are installed on the equipment and enters these data into the computer database. The program software compares the information obtained from the sensors with the data introduced in the database before starting the test and makes adjustments of the relays according to time and programmed relay (amps). The program reports the elapsed test time and according to schedule warns by a sound voice when to take the fluid sample (vials) to verify the presence or absence of bacteria. When the time set for the test is reached, the computer shut off the pump, close the database and informs the operator that the test is finished.

In the case of sulfate-reducing bacteria, it is recommended EMF intensities between 99 µT and 100 µT (50 to 60 W/cell), and electric field in the tube of 0.24 V/m. These values depend on the content of planktonic bacteria SRB that are in the fluid to be treated and the fluid velocity passing through the pipeline where it will be treated. The power of 16 W/m can generate from 1.5 µT to 80 µT EMF, depending on the connection that is made between the tube and the insulated electrical conductor cable, see FIG. 6.

Pipes containing microbiologically contaminated fluids which were subjected to EMF show clean internal surfaces (90% without biofilm); while pipes with microbiologically contaminated fluids not treated with EMF presented biofilm on its inner surface over 90% of the area.

What is claimed is:

1. An apparatus for the microbiological control of fluids in metallic tubing or conductive tubing-of electric current, by applying electric and magnetic fields obtained from alternating electrical current of low voltage and low frequency, comprising:
   a. a set of cells of tubing having the capability to either conduct or not conduct electricity, separated by electrically insulating joints, but hydraulically connected together to form sections or connected in series,
   b. each cell comprises at least a first isolated electrical conductor wire inserted inside of the tubing through a first stuffing box which prevents leaks of a fluid to be treated, the first isolated electrical conductor wire runs all along the length of the tubing until the first isolated electrical conductor wire gets out through a second stuffing box and is connected to the outside of the tubing at a first point close to a first hole located where the first isolated electrical conductor wire was inserted, at least a second insulated electrical conductor wire that is connected to a second point near a second hole where the first isolated electrical conductor wire gets out, and
   c. an alternating current source of low voltage and low frequency, in which a first and second end of the first isolated electrical conductor wire is connected to and in which a first and second end of the second isolated electrical conductor wire is also connected to.

2. The apparatus according to claim 1 wherein said alternating current source is controlled by software, which can vary the intensity and time of exposure to electric and electromagnetic fields.

3. The apparatus according to claim 1 characterized in that said cells have curved or helical forms.

4. The apparatus according to claim 3 wherein said cells have a U-shaped configuration.

5. The apparatus according to claim 1 wherein the tubing through which fluid flows is made of a material that conducts electricity or a material that does not conduct electricity.

6. The apparatus according to claim 5 wherein the tubing is an electrical conductor and is made of carbon steel, or other metallic or non-metallic materials.

7. The apparatus according to claim 5 wherein each cell comprises a first electrical conductor wire and a second electrical conductor wire.

8. The apparatus according to claim 7 wherein the first isolated electrical conductor wire enters the tubing several times.

9. The apparatus according to claim 8 wherein the number of times the first isolated electrical conductor wire enters the tubing, can be repeated from 1 to 100 times, and wherein the second isolated electrical wire, which does not enter the tubing, is connected to the outside of the tubing.

10. The apparatus according to claim 5 wherein the tubing is not electrical conductor.

11. The apparatus according to claim 10 wherein each cell comprises 1 to 100 first electrical conductor wires and between 1 and 100 second electrical conductor wires, where the number of first and second conductor wires is the same.

12. The apparatus according to claim 1 wherein the alternating current voltage applied to the electrical circuit is between 0.1 V and 12 V.

13. The apparatus according to claim 1 wherein the frequency of the applied alternating current voltage is from 20 Hz to 100 Hz.

14. The apparatus according to claim 1 wherein the frequency of the applied alternating current voltage is between 20 and 60 Hz (c.p.s.).

15. The apparatus according to claim 1 wherein the current flowing through the inside of the tubing has an intensity between 5 Amps and 100 Amps.

16. The apparatus according to claim 1 wherein the values of the electro-magnetic fields generated are between 1 µT and 300 µT.

17. A method for treating fluids by electromagnetic fields confined with high intensity produced within an apparatus for the microbiological control of fluids in metallic tubing or conductive tubing of electric current having a set of cells of tubing having the capability to either conduct or not conduct electricity, separated by electrically insulating joints, but hydraulically connected together to form sections or connected in series, each cell comprising at least a first isolated electrical conductor wire inserted inside of the tubing through a first stuffing box which prevents leaks of a fluid to be treated, the first isolated electrical conductor wire running all along the length of the tubing until said first isolated electrical conductor wire gets out through a second stuffing box and is connected to the outside of the tubing at a first point close to a first hole located where the first isolated electrical conductor wire was inserted, at least a second insulated electrical conductor wire connected to a second point near a second hole where the first isolated electrical conductor wire gets out, and an alternating current source of low voltage and low frequency, in which a first and second end of the first isolated electrical conductor wire is connected to and in which a first and second end of the second isolated electrical conductor wire is also connected to, comprising the following steps:

a) analyzing bacteria type and degree of contamination of an initial sample,
b) introducing a fluid to be treated through an entry point,
c) subjecting the fluid to be treated to an electromagnetic field where a field value from 1 µT to 300 µT is applied for a time ranging from 5 to 50 minutes, depending on the results of step a), and
d) removing the fluid treated through an exit point.

18. The method for fluid treatment of claim 17, wherein step c) is replaced by at least one of the following sub-steps:
c1. submitting the fluid to treat on a sub-step of mono constant field where a field value from 1 µT to 300 µT, is applied constantly for a defined time ranging from 5 to 50 minutes;
c2. submitting the fluid to be treated to the following series of EMF ON-OFF sub-steps: the application (ON) of a fixed EMF value from 1 µT to 300 µT, for a chose period of time, followed by a suspension of EMF (OFF) for a shorter period than the ON period, and cycles can be repeated until completing a total time of 5 to 50 minutes;
c3. submitting the fluid to be treated to a sub-step of ascending multi field, which applies a series of EMF's in ascending form, where the value of such ascending fields is between 1 µT to 300 µT, each EMF can last between 5 and 10 minutes to until completing a total time of 5 to 50 minutes, and/or;
c4. subjecting the fluid to be treated to alternating multi field sub-steps, during which a number of EMF's are applied alternately, in this sub-step a fixed value between 1 µT and 300 µT is selected, the fixed value is alternated with the application of field values ascending from 1 µT to 300 µT and cycles are repeated until completing a total time of 5 to 50 minutes.

19. The method for fluid treatment of claim 18, wherein the field values in sub-step c1) are 60 µT or 80 µT, and these field values must be applied for a time between 5 to 50 minutes.

20. The method for fluid treatment of claim 18, wherein the electro-magnetic field value in step c1) is 60 µT and is applied for a time of 20 minutes.

21. The method for fluid treatment of claim 18, wherein the value of the field in step c1) is 60 µT or 80 µT and this value is applied for 10 to 15 seconds, then the application of the field is suspended for 5 to 10 seconds and these cycles must be repeated until a total treatment of 25 to 35 minutes.

22. The method for fluid treatment of claim 18, wherein the field value in step c2) is 60 µT and is applied for 15 seconds, then the application of electromagnetic field is suspended for 5 seconds and treatment is repeated for a total time of 30 minutes.

23. The method for fluid treatment of claim 18, wherein step c3) starts with a value of 40 µT, followed by applying a field value of 60 µT, then one of 80 µT and finally, one of 100 µT, each EMF can last between 5 and 10 minutes; until complete treatment from 20 to 40 minutes.

24. The method for fluid treatment of claim 18, wherein in step c4) the field values applied correspond to the following sequence: 40 µT, 10 µT, 40 µT, 20 µT, 40 µT, 60 µT, 40 µT, 80 µT, 40 µT, 100 µT, 40 µT, 120 µT, 40 µT, 140 µT, 40 µT, 160 µT, 40 µT, 180 µT, 40 µT, 200 µT, 40 µT, 220 µT, 40 µT, 240 µT, 40 µT, 260 µT, 40 µT, 280 µT, 40 µT and 300 µT, each EMF can last from 1 to 10 minutes and these cycles are repeated until complete treatment from 5 to 50 minutes.

* * * * *